United States Patent
Schmidt

(10) Patent No.: US 10,414,510 B2
(45) Date of Patent: Sep. 17, 2019

(54) LANDING GEAR WITH THREADLESS CARDAN JOINT

(71) Applicant: Safran Landing Systems Canada Inc., Ajax (CA)

(72) Inventor: Robert Kyle Schmidt, Brooklin (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 439 days.

(21) Appl. No.: 15/396,195

(22) Filed: Dec. 30, 2016

(65) Prior Publication Data

US 2018/0186446 A1  Jul. 5, 2018

(51) Int. Cl.
*B64D 29/08* (2006.01)
*B64C 25/26* (2006.01)
(Continued)

(52) U.S. Cl.
CPC .............. *B64D 29/08* (2013.01); *B64C 25/26* (2013.01); *B64C 25/34* (2013.01); *B64C 25/60* (2013.01);
(Continued)

(58) Field of Classification Search
CPC ....... B64C 25/001; B64C 25/10; B64C 25/22; B64C 25/26; B64C 25/34; B64C 25/60; B64D 29/08; B64F 5/00
See application file for complete search history.

(56) References Cited

U.S. PATENT DOCUMENTS

| 2,422,576 A | * | 6/1947 | Martin | ................... B64C 25/26 244/102 SL |
| 4,147,316 A | * | 4/1979 | Kendall | .................. B64C 25/10 244/102 R |

(Continued)

FOREIGN PATENT DOCUMENTS

| EP | 2587083 A1 | 5/2013 |
| EP | 2669193 A2 | 12/2013 |

(Continued)

OTHER PUBLICATIONS

Extended European Search Report dated Feb. 21, 2018, issued in corresponding European Application No. 17210957.1, filed Dec. 28, 2017, 8 pages.

(Continued)

*Primary Examiner* — Justin M Benedik
(74) *Attorney, Agent, or Firm* — Christensen O'Connor Johnson Kindness PLLC

(57) ABSTRACT

A retractable landing gear includes a main strut having an upper end that is configured to connect to aircraft primary structure and a lower end configured to connect to an axle or bogie truck. An articulated stay has a distal end configured to connect to the aircraft structure and a proximal end pivotally connected to a cardan pin member. The cardan pin member has a cylindrical portion with a first recessed annular channel. The cardan pin member is retained in the socket by a ring assembly formed by two semi-annular ring members that slidably engages the first recessed channel.

(Continued)

The ring assembly defines a second recessed annular channel. A collar is configured to be positioned over the second recessed channel, and to contract upon a change in temperature to lockingly engage the second recessed channel, to secure the split ring assembly in the first recessed channel.

12 Claims, 4 Drawing Sheets

(51) Int. Cl.
  *B64C 25/34* (2006.01)
  *B64C 25/60* (2006.01)
  *B64F 5/00* (2017.01)
  *B64C 25/12* (2006.01)

(52) U.S. Cl.
  CPC .......... *B64F 5/00* (2013.01); *B64C 2025/125* (2013.01); *F05D 2240/14* (2013.01)

(56) References Cited

U.S. PATENT DOCUMENTS

| | | | | |
|---|---|---|---|---|
| 4,408,646 A * | 10/1983 | Forsyth | ................... | B60C 27/20 |
| | | | | 152/179 |
| 4,433,820 A * | 2/1984 | Turiot | ..................... | B64C 25/20 |
| | | | | 244/102 R |
| 4,556,179 A * | 12/1985 | Veaux | ..................... | B64C 25/22 |
| | | | | 244/102 A |
| 5,333,816 A * | 8/1994 | Del Monte | ............. | B64C 25/50 |
| | | | | 244/102 R |
| 8,104,711 B2 * | 1/2012 | Bennett | ................... | B64C 25/22 |
| | | | | 244/102 R |
| 8,136,759 B2 | 3/2012 | Lavigne et al. | | |
| 8,390,479 B2 * | 3/2013 | Wilby | ..................... | B64C 25/26 |
| | | | | 244/100 R |
| 8,523,106 B2 | 9/2013 | Thompson et al. | | |
| 8,651,417 B2 | 2/2014 | Hilliard et al. | | |
| 9,212,692 B2 | 12/2015 | Baudasse | | |
| 2008/0191090 A1 * | 8/2008 | Chow | ..................... | B64C 25/12 |
| | | | | 244/102 R |
| 2009/0101754 A1 * | 4/2009 | O'Connell | .............. | B64C 25/50 |
| | | | | 244/102 SL |
| 2012/0132742 A1 * | 5/2012 | O'Connell | .............. | B64C 25/50 |
| | | | | 244/100 R |
| 2013/0313360 A1 | 11/2013 | Chow et al. | | |
| 2016/0137295 A1 * | 5/2016 | Bond | ..................... | B64C 25/24 |
| | | | | 244/102 A |
| 2016/0200453 A1 * | 7/2016 | Williams | ................ | B64C 25/26 |
| | | | | 74/527 |

FOREIGN PATENT DOCUMENTS

| | | |
|---|---|---|
| EP | 3069993 A1 | 9/2016 |
| WO | 2006/053433 A1 | 5/2006 |

OTHER PUBLICATIONS

Stoeckel, D., and Borden, T., "Actuation and Fastening with Shape Memory Alloys in the Automotive Industry," Metall Wissenschaft + Technik 46(7):668-672, Jul. 1992.

* cited by examiner

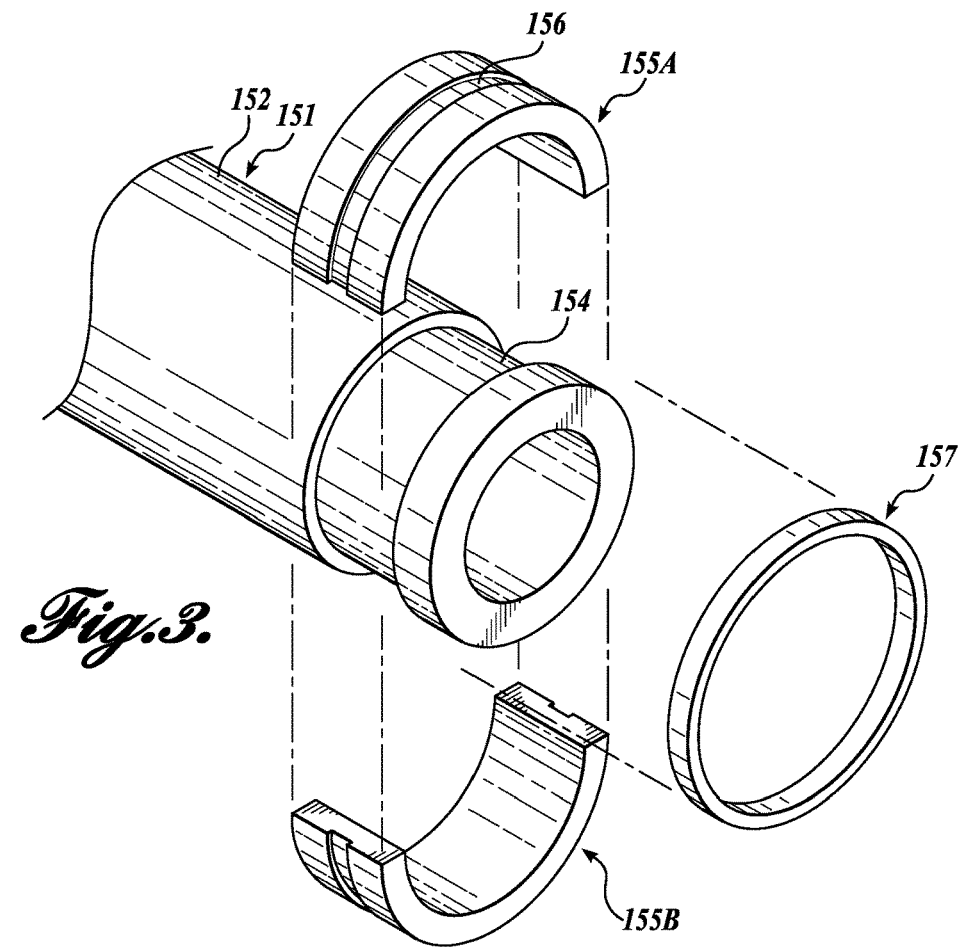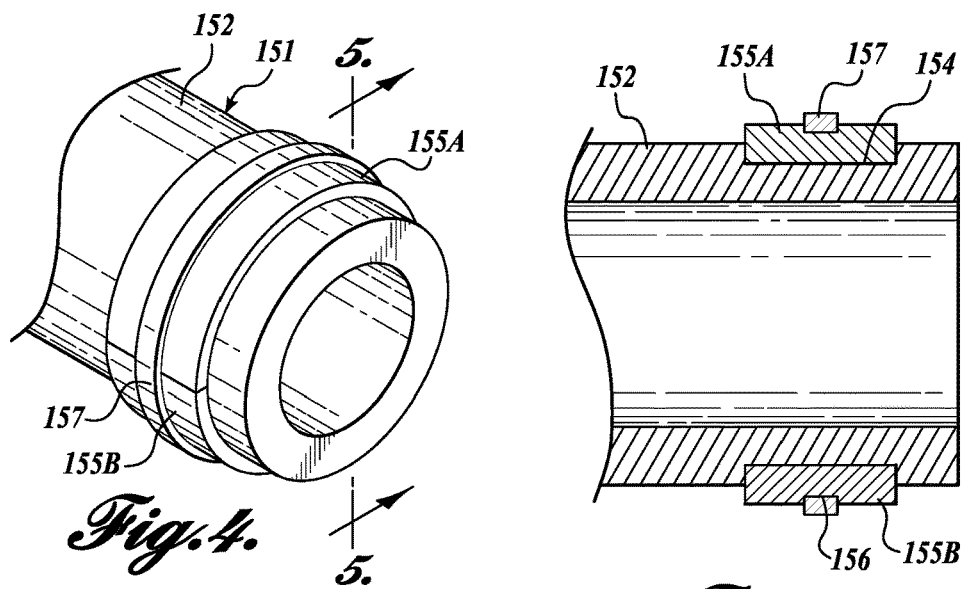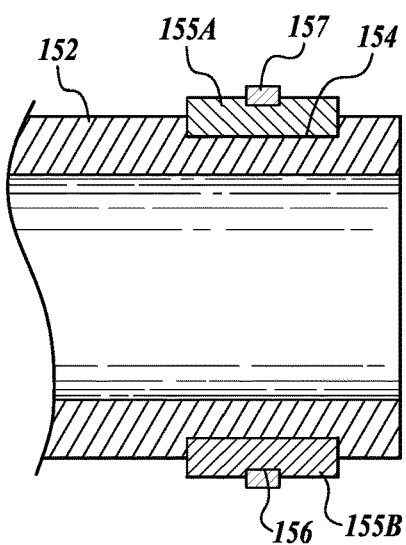

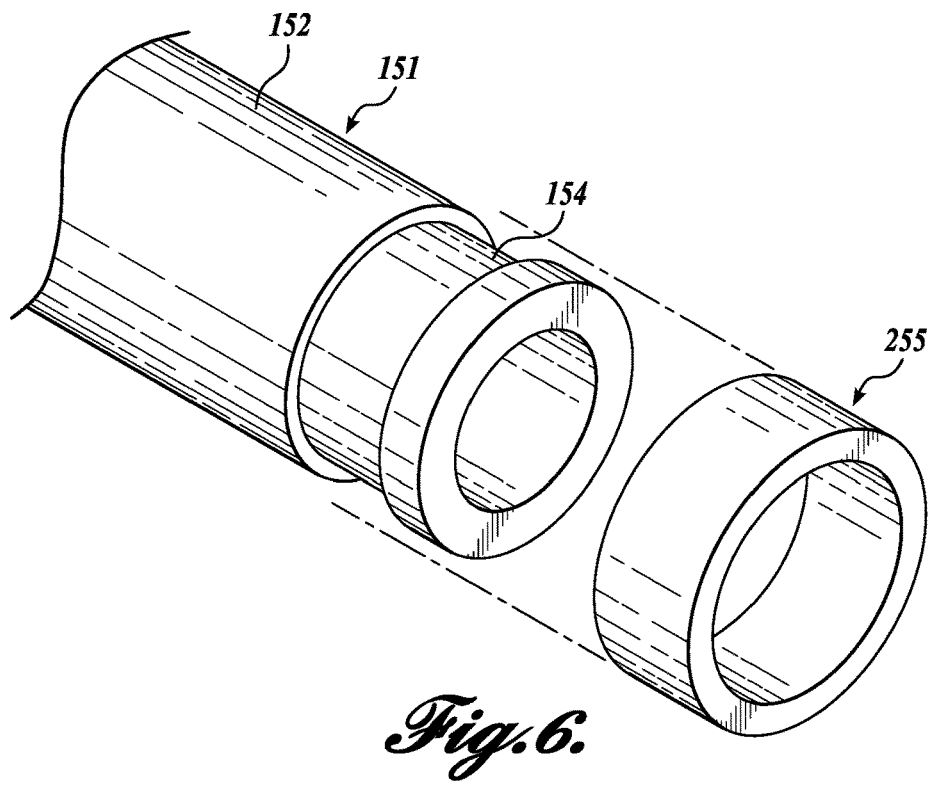
Fig.6.
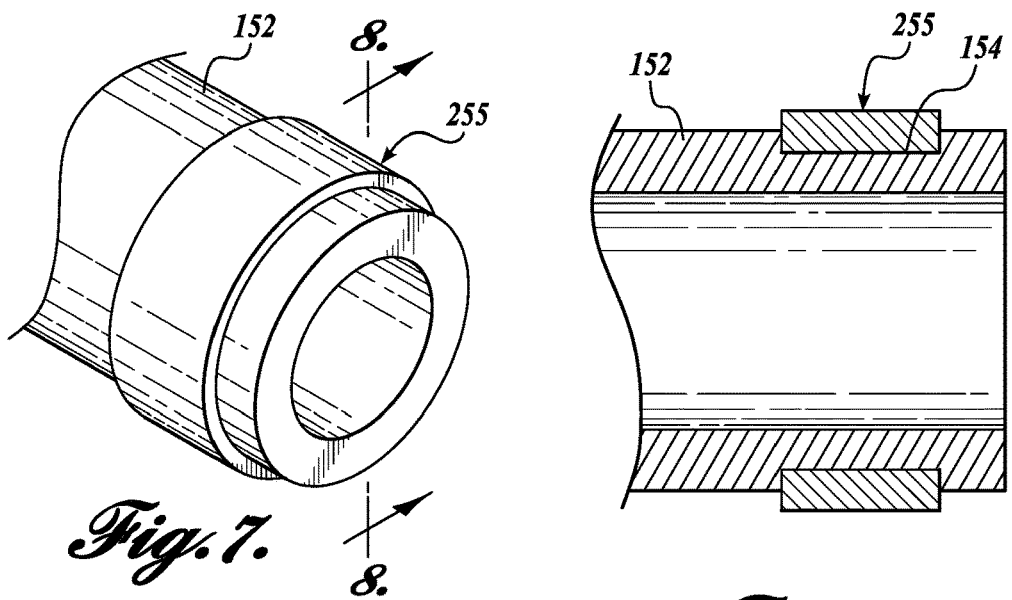
Fig.7.
Fig.8.

LANDING GEAR WITH THREADLESS CARDAN JOINT

BACKGROUND

The engineering design of landing gear for commercial aircraft presents many challenges. The landing gear is attached to the primary structure of the aircraft, and supports the entire weight of the aircraft during landing and ground operations. The landing gear must withstand the recurring transient forces associated with taking off and in particular, landing. Very high forces may be incurred in "hard landings," for example, when the aircraft approaches the ground with a greater-than-planned vertical velocity. Hard landings may result from adverse weather conditions, mechanical issues, pilot error, or the like. During flight the landing gear is subjected to continuous shaking and vibrational forces. During ground operations the landing gear may also be engaged for towing the aircraft to and from locations at the terminal.

To decrease drag and improve performance of an aircraft, the landing gear in most commercial aircraft are articulated and configured to retract into a landing gear bay in the body or wing of the aircraft during flight. Retractable landing gear must be able to readily retract into the landing gear bay, and reliably deploy to a locked position upon approach to the desired destination. Retractable landing gear typically includes one or more folding stays (also called struts) which may include associated downlock actuators. The stays deploy to securely lock the landing gear in the deployed position. For example, a side stay provides support against side loads. A drag strut provides support against fore and aft loads.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A landing gear for an aircraft includes a main strut having a socket, an articulated stay having a first end, and a cardan pin member pivotably attached to the first end of the stay. The cardan pin member has a cylindrical post portion pivotable in the socket. The cylindrical post portion defines a first annular recess that is located below the socket, such that the cardan pin member pivotably attaches the stay to the main strut in a cardan joint. The cylindrical post is unthreaded. A ring-shaped retainer defined by two semi-annular ring members slidably engages the first annular recess and defines an outer surface having a maximum transverse dimension, and defining a outwardly-open second annular recess. An annular locking collar having a first inner diameter during installation that is greater than the maximum transverse dimension is positioned over the second annular recess, and is configured to contract to a second inner diameter that is less than the maximum transverse dimension by a change in temperature, such that the locking collar engages the second annular recess, securing the ring-shaped retainer in the first annular recess.

In an embodiment the locking collar is configured to be thermally heated to a temperature sufficient to produce the first inner diameter, such that the second inner diameter contracts to the second inner diameter to lockingly engage the second annular recess upon cooling.

In an embodiment the locking collar comprises a nitinol alloy and is configured to contract from the first inner diameter to the second inner diameter upon heating the locking collar to a temperature sufficient to induce a martensitic transformation.

In an embodiment the annular locking collar is configured to apply a compressive force on the first and second semi-annular ring members during use.

In an embodiment the cardan pin member has no threads and no splines.

In an embodiment the main strut is a shock-absorbing strut.

In an embodiment the main strut comprises an outer cylinder configured to attach to an aircraft primary structure, and an inner cylinder that slidably engages the outer cylinder, wherein the inner cylinder is configured to attach to a bogie truck, and wherein the inner and outer cylinders define a volume containing a gas and an oil.

In an embodiment the gas is nitrogen and the oil is a hydraulic fluid.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is an exploded detail view of the post for the cardan joint shown in FIG. 2, including a split ring retainer assembly for pivotally locking the cardan post in a mounting socket of the shock absorbing strut (not shown);

FIG. 4 is a detail view showing the end of the post shown in FIG. 3, with the split ring retainer installed;

FIG. 5 is a sectional detail view of the post shown in FIG. 4 through section 5-5 indicated in FIG. 4;

FIG. 6 is a detail view showing a second embodiment of a cardan post and retainer in accordance with the present invention;

FIG. 7 is a detail view showing the end of the cardan post shown in FIG. 6;

FIG. 8 is a sectional detail view of the post through section 8-8 indicated in FIG. 7.

DETAILED DESCRIPTION

Figure 1:
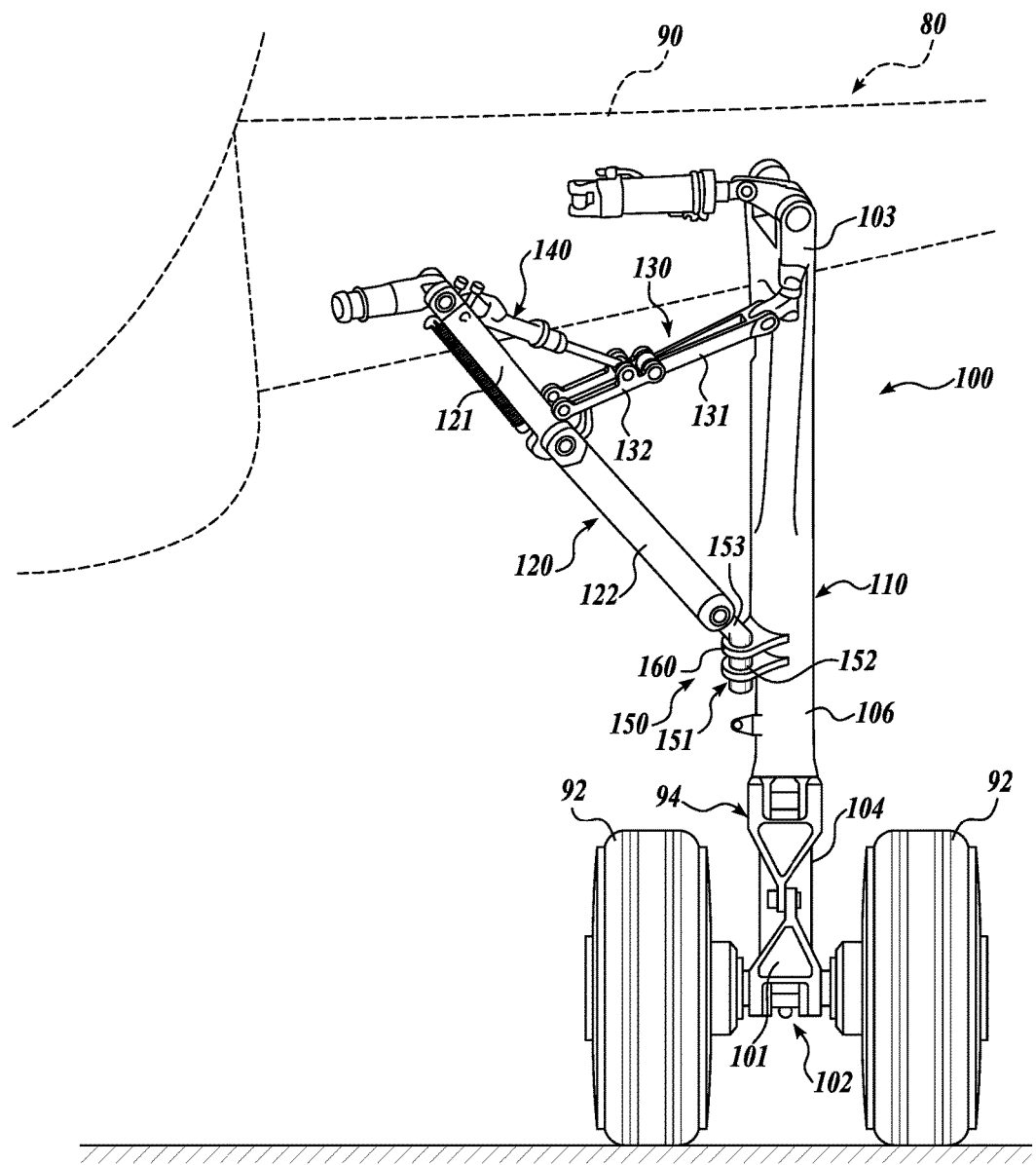
FIG. 1 illustrates a retractable landing gear for an aircraft in accordance with the present invention.
Figure 2:
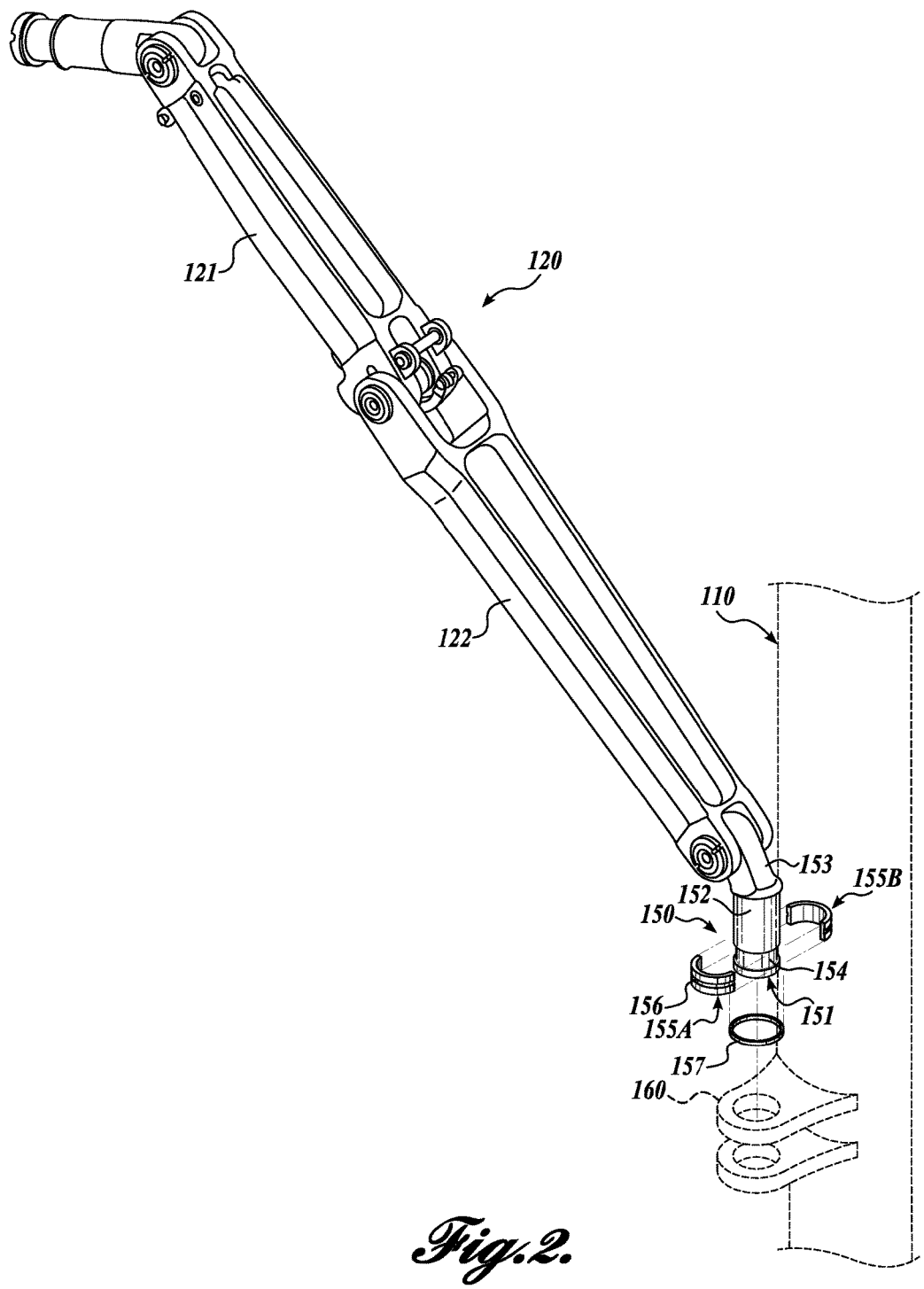
FIG. 2 is a perspective view of a stay for the retractable landing gear shown in FIG. 1, with a cardan joint near a lower end of the stay, with the main strut indicated in dashed line.

A first embodiment of a landing gear 100 (e.g., a two-wheel main landing gear) in accordance with the present invention is shown in an environmental view in FIG. 1, located below the wing 90 of an aircraft 80 (indicated schematically in broken line), wherein details that are not relevant to novel aspects of the present invention are not shown, for clarity, for example the retraction actuator, hydraulic lines and control system components.

The landing gear 100 includes a main shock absorbing strut 110 having a lower end 101 supported on an axle 102 or a wheeled undercarriage bogie truck mounting a plurality of wheels 92, and an upper end 103 that is pivotally connected to the airframe. An exemplary bogie truck is disclosed in U.S. Pat. No. 8,651,417 to Hilliard et al., which is hereby incorporated by reference in its entirety. The shock absorbing strut 110 illustrated in FIG. 1 may be a hybrid pneumatic and hydraulic shock absorbing strut 110, sometimes referred to an oleo strut (or oleo pneumatic strut) which is known in the art. The oleo strut includes a lower portion comprising an inner cylinder (also called a piston) 104 that is attached to the axle 102 or bogie truck mounting one or more wheels 92, and an upper portion comprising an outer cylinder 106 that slidably receives the inner cylinder 104. The cylinders 104, 106 may be held in alignment with a scissors or torque link assembly 94.

The cylinders 104, 106 are filled with a gas and an oil. Usually the gas is nitrogen which is relatively inert, and the oil is a hydraulic fluid. One or more flow restrictions (not shown), for example a transverse plate having a small orifice, divides the interior volume defined by the cylinders 104, 106 into two chambers. When the wheels 92 contact the ground during landings, the aircraft momentum and weight forces the lower cylinder 104 to slide upwardly further into the upper cylinder 106 compressing the enclosed volume. The nitrogen gas acts as a spring, compressively absorbing some of the energy of the landing. In addition, the lower cylinder 104 forces oil through the flow restriction(s), thereby dissipating much of the energy as work and heat, and reducing the tendency of the aircraft 80 to rebound or bounce during landings.

The landing gear 100 shown in FIG. 1 includes a stay 120 having an upper link 121 that is pivotally attached to a lower link 122. The stay 120 extends during deployment of the landing gear 100, and secures the shock absorbing strut 110 in the deployed position. The upper end of the stay 120 is attached to the airframe, and the lower end of the stay 120 is attached near a lower end of the upper cylinder 106 of the shock absorbing strut 110 in a cardan pin joint 150, as discussed in more detail below.

A lock stay 130 is also shown, and includes a first link 131 that is pivotally connected to a second link 132. An opposite end of the first link 131 is pivotally connected near an upper end of the upper cylinder 106, and an opposite end of the second link 132 is pivotally connected to the upper link 121 of the stay 120, near the connection to the stay lower link 122. A downlink actuator 140 is pivotally connected near an upper end of the stay upper link 121, and pivotally connected to the lock stay second link 132.

The cardan pin joint 150 comprises a pin member 151 having a cylindrical lower end portion or post 152 and an angled upper portion 153. The angled upper portion 153 is configured to pivotally connect with the lower end of the lower link 122 of the stay 120.

The cylindrical post 152 is sized to be inserted into and through a cylindrical aperture in a socket 160 formed on the upper cylinder 106 of the shock absorbing strut 110, such that the pin member 151 is able to pivot in the socket 160 about an axis that is generally parallel to the axis of the shock absorbing strut 110.

In prior art, retractable landing gear the pin member of the cardan pin joint is secured in the socket using a threaded connection (e.g., with a retention nut). Because the nut is the lock device on a rotating joint, good design practice (and typical certification standards) requires a second, independent locking device. In prior art systems a splined lock plate slides onto splines on the cardan pin, and is then locked into place by bolting the lock plate to the retention nut. The threads and splines on prior art cardan pin joint are a limiting factor in the design of the landing gear.

Typically, the joint components are made from ultra-high tensile strength steels, and the threads and splines will corrode in service. The conventional cardan pin joint for landing gear requires regular inspection and overhaul/servicing. In addition, the threads and splines on the joint limit the adoption of several classes of corrosion-resistant materials, such as corrosion-resistant steels and titanium, due to these materials galling and seizing when used in threaded arrangements. Prior attempts to solve this problem include using corrosion preventive coatings, such as cadmium or zinc-nickel, for example, and/or using anti-galling compounds or dissimilar materials for the galling-sensitive materials. However, such methods have not been effective. In-service corrosion has been found in cardan pin joints even when such coatings have been applied. The corrosion is believed to result from the coatings wearing away when used on threaded and/or splined features. Moreover, although using dissimilar materials can avoid galling, they may also lead to galvanic corrosion issues. It will also be appreciated that threads and spline features can result in undesirable stress concentration in the components.

As seen in FIGS. 1-5, the landing gear 100 uses a novel threadless cardan pin joint 150 that does not require threads or splines. In particular, the cardan pin member 151 has a cylindrical post 152 that includes an outer, annular channel or recess 154 near an end of the cylindrical post 152. A split ring (see FIGS. 3-5) comprising a pair of semi-annular rings 155A, 155B is configured to engage the annular recess 154. The semi-annular rings 155A, 155B are sized such that when the corresponding ends of the semi-annular rings 155A, 155B abut as shown in FIG. 4, the inner diameter defined by the abutting semi-annular rings 155A, 155B is greater than or equal to the diameter of the annular recess 154 and is less than the diameter of the portions of the post 152 adjacent to the annular recess 154.

The semi-annular rings 155A, 155B further include relatively narrow channels or annular recesses 156 on their outer surface that cooperatively define a second annular recess 156. A ring member or locking collar 157 is configured with an inner diameter to lockingly engage the second annular recess 156.

The locking collar 157 is formed from a material that can be thermally processed to engage the second annular recess 156. For example, in one embodiment the locking collar is formed from a nickel titanium alloy, sometimes referred to as nitinol, that has a shape memory property. In particular, nitinol's unusual properties are due to a reversible martensitic transformation between two different martensite crystal phases. For the present application, the locking collar 157 may be formed having an inner diameter that allows the locking collar to receive the abutting semi-annular rings 155A, 155B in order to position the locking collar over the second annular recess 156. The locking collar 157 may then be heated to induce a phase transformation causing the locking collar 157 to contract, reducing the diameter such that the locking collar 157 is secured in the second annular recess 156. For example, suitable material for the locking collar 157 is available from Intrinsic Devices Incorporated, San Francisco, Calif., marketed under the UniLok™ mark.

In another embodiment the locking collar is formed from a more conventional metal having a coefficient of thermal expansion that is sufficiently large that the locking collar 157 may be thermally expanded to an inner diameter that is greater than the outer diameter of the assembled semi-annular rings 155A, 155B. After the heated locking collar 157 is positioned at the second annular recess 156 and allowed to cool such that the diameter of the locking collar 157 returns to a pre-expanded diameter such that the locking collar 157 is captured in the second annular recess 156.

In an embodiment the locking collar 157 is sized with an inner diameter such that the locking collar 157 applies a clamping force to the abutting semi-annular rings 155A, 155B.

Although in the current embodiment the semi-annular rings 155A, 155B have a circular outer surface, it is contemplated that the outer surface may alternatively be non-circular. In order to install the locking collar 157 in the second annular recess 156, it is preferable that the locking collar be configured to be thermally expanded sufficiently that the inner diameter of the locking collar 157 has a diameter that is greater than the maximum transverse dimension cooperatively defined by the first and second semi-annular rings 155A, 155B.

The cardan pin member 151 may be pivotally attached to the main strut 110 by inserting the cylindrical post 152 of the pin member 151 into the main strut socket 160 such that the annular recess 154 extends below the socket 160. The semi-annular rings 155A, 155B are then positioned into the recess 154. The locking collar 157 is heated sufficiently, positioned over the second annular recess 156, and allowed to cool such that the locking collar 157 engages the second annular recess 156, such that the semi-annular rings 155A, 155B are locked in the annular recess in the cylindrical post 152.

An advantage of this attachment method is that the locking collar 157 may be designed optimally to provide the hoop stresses desired to retain the semi-annular rings 155A, 155B in the recess 156. In particular, the locking collar 157 does not have to react axial forces related to retaining the cylindrical post 152 in the socket 160 (these forces are handled by the semi-annular rings 155A, 155B).

FIGS. 6-8 illustrate the post and retainer portion for a second embodiment of a landing gear assembly in accordance with the present invention. In this embodiment the landing gear assembly is similar to the landing gear assembly 100 described above, except that the mechanism for pivotally locking the cylindrical post 152 of the pin member 151 uses a single ring member 255, rather than a split ring with a separate locking collar. Descriptions of other aspects of the landing gear will not be repeated, for brevity and clarity.

FIG. 6 shows an exploded view of the cylindrical post 152 with the annular recess 154, FIG. 7 shows an assembled view of the post assembly, and FIG. 8 shows a sectional view of the post assembly. In this embodiment annular ring member 255 has an inner diameter that is approximately equal to the diameter of the annular recess 154. The ring member 255 is formed either from a material having a coefficient of thermal expansion that is sufficiently large that the ring member 255 may be thermally expanded such that the inner diameter is greater than the outer diameter of the cylindrical post 152 distal from the annular recess 154, or from a nitinol shape memory material and configured such that the ring member 255 will contract from the first inner diameter to the second inner diameter upon heating the locking collar to a temperature sufficient to induce a martensitic transformation In the thermal expansion embodiment the ring member 255 is heated to fit over the end of the post 152, and positioned at the annular recess 154. The ring member 255 is allowed to cool, whereby the ring member 255 is captured in the annular recess 154. In an embodiment the ring member 255 is sized with an inner diameter such that when the ring member 255 and the post 152 are at a design temperature the ring member 255 applies a clamping force to the post 152.

In the nitinol embodiment the ring member 255 is formed to fit over the end of the post 152, and positioned at the annular recess 154. The ring member 255 is then heated to induce the martensitic transformation such that the ring member 255 lockingly engages the annular recess 154.

While illustrative embodiments have been illustrated and described, it will be appreciated that various changes can be made therein without departing from the spirit and scope of the invention.

The embodiments of the invention in which an exclusive property or privilege is claimed are defined as follows:

1. A landing gear for an aircraft, the landing gear comprising:
a main strut having a socket;
an articulated stay having a first end;
a cardan pin member pivotably attached to the first end of the articulated stay and further comprising a cylindrical post portion pivotably disposed in the main strut socket, the cylindrical post portion defining a first annular recess disposed below the socket, such that the cardan pin member pivotably attaches the stay to the main strut in a cardan pin joint;
a ring-shaped retainer comprising a first semi-annular ring member and a second semi-annular ring member such that the first and second semi-annular ring members slidably engage the first annular recess cooperatively defining a radially outer surface, the ring-shaped retainer having a maximum transverse dimension, wherein the ring-shaped retainer defines an outwardly-open second annular recess; and
an annular locking collar having a first inner diameter that is greater than the maximum transverse dimension of the ring-shaped retainer during installation such that the annular locking collar can be positioned over the second annular recess, and wherein the annular locking collar is configured to contract to a second inner diameter that is less than the maximum transverse dimension of the ring-shaped retainer by a change in temperature of the locking collar, such that the annular locking collar lockingly engages the second annular recess.

2. The landing gear of claim 1, wherein the locking collar is configured to be thermally heated to a temperature sufficient to produce the first inner diameter, wherein the locking collar contracts to the second inner diameter to lockingly engage the second annular recess upon cooling to ambient temperature.

3. The landing gear of claim 1, wherein the locking collar comprises a nitinol alloy and is configured to contract from the first inner diameter to the second inner diameter upon heating the locking collar to a temperature sufficient to induce a martensitic transformation.

4. The landing gear of claim 1, wherein the annular locking collar is configured to apply a compressive force on the first and second semi-annular ring members during use.

5. The landing gear of claim 1, wherein the cardan pin member is threadless.

6. The landing gear of claim 5, wherein the cardan pin member does not have a spline.

7. The landing gear of claim 1, wherein the main strut is a shock-absorbing strut.

8. The landing gear of claim 1, wherein the main strut comprises an outer cylinder configured to attach to an aircraft primary structure, and an inner cylinder that slidably engages the outer cylinder, wherein the inner cylinder is configured to attach to a bogie truck, and wherein the inner and outer cylinders define a volume containing a gas and an oil.

9. The landing gear of claim 8, wherein the gas is nitrogen and the oil is a hydraulic fluid.

10. A method for assembling a landing gear for an aircraft, the landing gear comprising:
   a main strut having a socket, and an articulated stay having a first end;
   pivotally attaching a cardan pin to the first end of the articulated stay, wherein the cardan pin member comprises a cylindrical post portion;
   inserting the cylindrical post portion into in the main strut socket such that the cardan pin member pivotally attaches the stay to the main strut in a cardan pin joint, wherein the cylindrical post portion defines a first annular recess disposed below the socket;
   slidably inserting a ring-shaped retainer comprising a first semi-annular ring member and a second semi-annular ring member into the first annular recess such that the first and second semi-annular ring members slidably engage the first annular recess and cooperatively define a radially outer surface, the ring-shaped retainer having a maximum transverse dimension,
   locking the ring-shaped retainer in the first annular recess with an annular locking collar having a first inner diameter that is greater than the maximum transverse dimension of the ring-shaped retainer during installation such that the annular locking collar can be positioned over the second annular recess, and wherein the annular locking collar is configured to contract to a second inner diameter that is less than the maximum transverse dimension of the ring-shaped retainer by a change in temperature of the locking collar, such that the annular locking collar lockingly engages the second annular recess.

11. The method of claim 10, wherein the locking collar is configured to be thermally heated to a temperature sufficient to produce the first inner diameter, wherein the locking collar contracts to the second inner diameter to lockingly engage the second annular recess upon cooling to ambient temperature.

12. The method of claim 10, wherein the locking collar comprises a nitinol alloy and is configured to contract from the first inner diameter to the second inner diameter upon heating the locking collar to a temperature sufficient to induce a martensitic transformation.

\* \* \* \* \*